(No Model.)

J. L. OSGOOD.
Cartridge Loader.

No. 231,445. Patented Aug. 24, 1880.

Witnesses
John Edwards Jr
L. B. Burr

Inventor
J. Lester Osgood
By James Shepard Atty

UNITED STATES PATENT OFFICE.

JOHN LESTER OSGOOD, OF NEW BRITAIN, CONNECTICUT.

CARTRIDGE-LOADER.

SPECIFICATION forming part of Letters Patent No. 231,445, dated August 24, 1880.

Application filed April 7, 1880. (No model.)

*To all whom it may concern:*

Be it known that I, J. LESTER OSGOOD, of New Britain, in the county of Hartford and State of Connecticut, have invented certain new and useful Improvements in Machines for Loading Cartridges, of which the following is a specification.

My invention relates to improvements in cartridge-loading machines in which a shell-holding device is used in conjunction with feeding, measuring, and compressing devices; and the objects of my invention are, first, to so feed the powder to the measuring devices that a uniform quantity will be measured no matter whether there is a small or large quantity in the hopper; second, to afford facilities for the proper adjustment of the measuring device without changing the position of the delivery-chute; third, to firmly support the shell while the powder is compressed within it; and, fourth, to provide a cheap, compact, and convenient machine for filling and refilling shells. I attain these objects by the mechanism illustrated in the accompanying drawings, in which—

Figure 1:
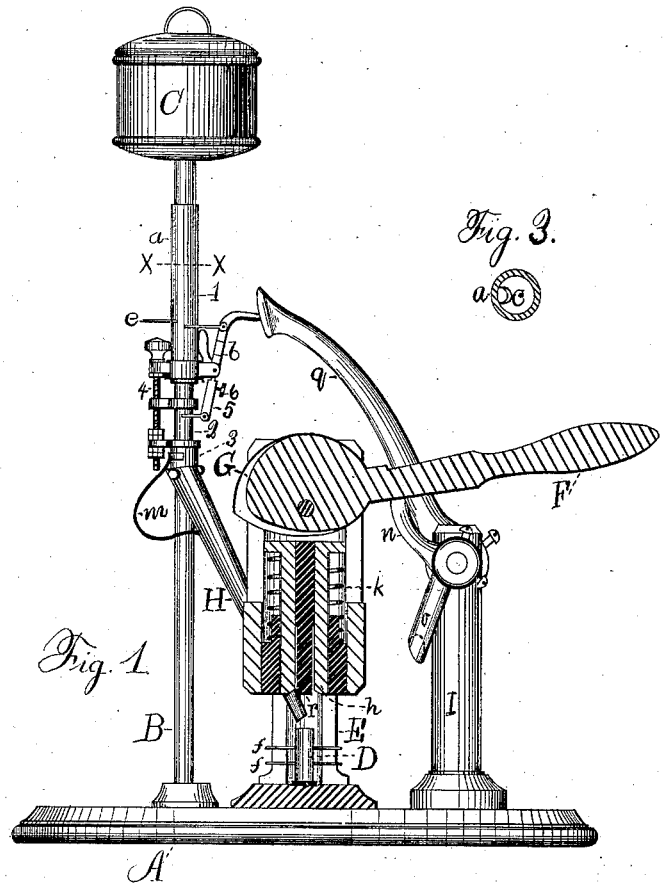
Figure 2:
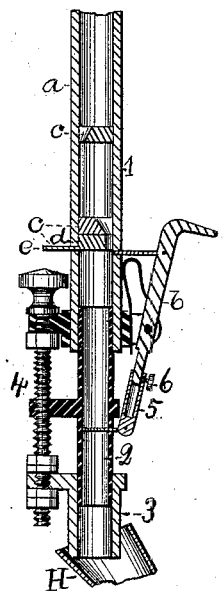
Figure 3:
Figure 4:
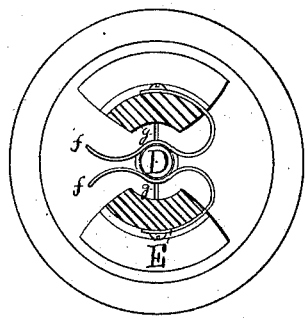

Figure 1 is a side elevation, partly in vertical section. Fig. 2 is a vertical section of the measuring devices. Fig. 3 is a transverse section of the conductor or feeding-tube on line $x\ x$ of Fig. 1. Fig. 4 is a horizontal section, showing the shell in position for filling; and Fig. 5 is a vertical section, showing the operation of the compressing devices.

Figure 5:
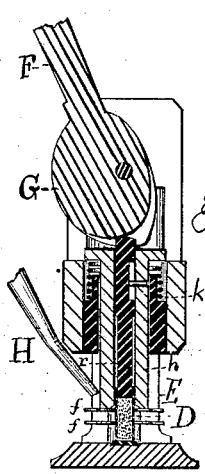

Similar letters refer to similar parts throughout the several views; but Figs. 1 and 5 are on a scale only half the size of that employed in the other figures.

A designates a base or platform, upon which is mounted a standard or upright, B. At the top of said standard there is a powder-receptacle, C, having a flaring or hopper-shaped bottom, from which a feeding-tube or conductor, $a$, extends downward. Toward the lower end of this tube $a$ there is a double-gated and spring-actuated lever, $b$, or measuring device quite similar in its general character to those ordinarily used upon shot and powder flasks. It differs therefrom, however, by reason of its adjustability, as hereinafter described.

I have found, in practice, that if the whole weight of the powder in the receptacle is allowed to press downward upon the measuring device it compresses the powder, being measured so that a greater quantity would be measured at one time when the receptacle was full, or nearly so, than would be the case when there was only a small quantity in the receptacle. In order to prevent such a result and to measure each charge definitely, so that a uniform quantity will be always measured with great accuracy, no matter whether the receptacle is nearly full or otherwise, I place within the conductor $a$ two steps or shelves, $c\ c$, the same being circular pieces of a size to fit and fill the conductor, but with a notch or opening cut out upon one side, and these are arranged with the notches upon opposite sides of the tube or conductor $a$, as shown in Fig. 2. The great bulk of the pressure of the powder is arrested by the flat upper side of the upper step, while still enough powder passes through the notch of said step to feed properly, which powder is, in turn, arrested by the second or lower step, and then fed into the measuring device without any pressure from the powder in the receptacle.

Immediately below the lower step there is a cut-off, $d$, the same being a circular piece provided with a notch upon one side and a handle, $e$, for turning it within the tube, so that it may register with the notch in the lower step, and thereby open and close the passage through the conductor $a$. As this cut-off is not only immediately below the lower step, but also immediately above the upper gate of the measuring device, it will be seen that the supply may be cut off at any time, and leave only the proper amount below said cut-off to fill the measuring device.

Upon the base there is another upright, E, to which is attached a shell-holder and a compressing device, the former consisting of suitable spring-clamps $f\ f$, into or between which the shell D is placed to hold it in proper position for filling and pressing. I also provide a simple take-off, $g$, which engages the projecting rim of the shell D and holds it down. This take-off may be of any desired form, and its operation is similar to a take-off as ordinarily employed in connection with a punch in a power-press. In the present instance it consists of two simple pins passed through the upright E, one upon each side of the shell-holder and just above the rim of the shell. The inner ends of these pins are such a distance apart that the body of the shell may be readily slipped between them, with the rim under their ends, while they are so near together that when the piston (hereinafter described) is withdrawn from the shell their ends will catch upon the rim and prevent the shell from being lifted or raised with the piston, the same as a plate, or the scrap is pulled off from a punch in its ascent after action.

The compressing device is somewhat similar to a double-acting press. To the upper end of the upright E a lever, F, is hung, to which a two-faced cam, G, is attached, or more properly, perhaps, two cams. This upright E is hollow, and within it is a hollow guard, $h$, the bore through which is of a size that will just fit and embrace the outside of the shell. This guard is compressed by the cam and lever G F, and is elevated by a spring, $k$. Inside of this guard is a follower or piston, $r$, the lower end of which is of a size that will just fit and fill the inside of the shell. Its upper end fills the hole or bore through the guard, and it is held in place by a pin which enters a longitudinal slot in the side of said piston in such manner as to allow a certain extent of independent movement. After repeated firing shells expand at the mouth, and if desired the guard, whose mouth is tapering, may be made small enough to contract or crimp the shell at the same time that the powder is compressed within it.

A hinged or pivoted chute, H, leads from the lower end of the conductor $a$ to the shell in the holder, as shown in Fig. 1. A spring, $m$, bears upon said chute with a constant tendency to press its lower end against the lower end of the guard $h$.

A third upright is also placed upon the base A, and in its upper end is a horizontal shaft, to which an arm $n$ is rigidly attached, said arm being so placed as to come under the lever F upon the rear side of the upright E. Another arm, $o$, is also secured to the same shaft, and comes in contact with the upright I, to act as a stop to limit the motion of the lever F and arm $n$. Upon the opposite side of the upright I, and secured to the same shaft, there is a lever, $q$, the upper end of which bears against the upper end of the double-gated lever $b$.

The operation is as follows: The shell to be filled or refilled is slipped into the holder, after which the lever F, if not already in the position shown in Fig. 1, is brought into that position and then depressed, thereby depressing the arm $n$ and forcing the lever $q$ forward to operate the lever $b$ of the measuring device, so that its upper gate is closed and its lower one opened. The powder then runs through the chute H into the shell D. The lever F is then brought forward, when the greatest projection of the cam G forces the guard down to embrace the shell. The hinged feature of the chute now comes into action and allows the lower end thereof to be pressed one side out of the way of the guard, and when the guard is again raised the spring $m$ returns the chute to its former position.

As the guard descends the gravity of the follower or piston $r$ within the guard causes them (the guard and follower) at first to move downward together until the piston reaches the powder in the shell and is stopped in its downward course, and the guard moves on without it until said guard reaches the position represented in Fig. 5, after which the portion of the cam G which acts upon the upper end of the guard is concentric, and the guard remains stationary during the farther forward movement of the lever. The guard when thus depressed embraces the upper end of the shell and holds it firmly in place. The middle portion of the cam G then acts upon the upper end of the piston and drives it into the shell as the lever moves forward and is stopped at a definite point, thereby compressing the powder to a uniform and definite depth.

In Fig. 5 the parts are represented with the piston but slightly depressed within the shell; but upon further movement of the lever F it will be depressed until its lower end is in the same plane as the lower end of the guard $h$. The lever F is next thrown backward into the position represented in Fig. 1, when the filled shell is removed and another one inserted, and the operation before described repeated.

Although the device may be used for definite work without any adjustability of the measuring device, it is desirable for general use to so adjust the device as to measure any desired quantity within certain limits; and, further, it is desirable to make said adjustment without any disturbance of the chute H. I therefore make the tube $a$ in three parts, 1, 2, and 3. The parts 1 and 3 are of the largest diameter and both of the same size, while the part 2 is of smaller diameter and is telescoped at each end into the parts 1 and 3. By the side of these parts and in suitable arms there is an adjusting-screw, 4, provided with set-nuts or collars, and so mounted in said arms that it may be revolved without affecting any endwise movement or other change in position of the parts 1 and 3.

The arm which extends from and is secured to the part 2 is provided with a female screw, which fits that of the screw 4, while the other arms through which said screw passes are not threaded, from which it will be seen that turning the screw 4 will raise and lower the part 2 of the tube $a$.

The upper gate of the lever $b$ and the hinge or fulcrum of said lever are connected to the part 1, while the lower end and gate of said lever are connected to the part 2. This lower end of the lever $b$ is made extensible by having one part enter a socket, 5, bearing a set-screw, 6. When this set-screw is loosened the part 2 may be adjusted to bring the lower gate a greater or less distance from the upper gate, so as to measure the desired quantity. The set-screw 6 may then be tightened and the device will operate the same as if the lever $b$ were a solid one and in the manner before described.

I claim as my invention—

1. The combination of the following elements, viz: first, the receptacle C; second, the measuring device; third, the tubular conductor $a$, extending from the receptacle to the measuring device; and, fourth, two or more steps or shelves located within the tubular conductor upon opposite sides, substantially as described, and for the purpose specified.

2. The combination of the double-gated and extensible lever $b$ 5 6, the stationary parts 1 and 3 of the tubular conductor $a$, the movable part 2 of said conductor, located between the parts 1 and 3, and mechanism for adjusting the part 2 while the parts 1 and 3 upon each end thereof are stationary, substantially as described, and for the purpose specified.

3. The combination of the double-gated and extensible lever $b$ 5 6, the stationary parts 1 and 3 of the conductor $a$, the adjusting-screw 4, mounted on parts 1 and 3 so as to rotate, but not to move longitudinally, in its bearings, and the movable part 2 of the conductor, located between the parts 1 and 3, and having a threaded arm or lug, through which the threaded part of the adjusting-screw passes, substantially as described, and for the purpose specified.

4. The combination of a shell-holder for receiving and retaining a shell in position for filling, the chute H, leading to the shell in the holder, and the feeding and measuring device, having the stationary tubular part 3 at its lower end, with the chute connected thereto, and the movable tube 2, adapted to slide vertically to adjust the capacity of the measuring device without disturbing the relation of the part 3 and chute H to the shell-holder and shell, substantially as described, and for the purpose specified.

5. The combination of the upright E, the hollow guard $h$, fitted to move longitudinally therein, the spring $k$, the piston $r$, fitted to slide within the guard, but limited in its longitudinal movement, and the cam G, hung upon a single pivot, but having two distinct operating-surfaces for acting upon the upper ends of the guard and piston, respectively, substantially as described, and for the purpose specified.

6. The combination of the shell-holder for receiving and retaining the shell in position, the hollow guard $h$, for embracing the upper end of the shell, the piston $r$, for entering the shell and compressing the powder therein, and the cam-lever G F, for acting upon said guard and piston, in the manner and for the purpose specified, substantially as set forth.

7. The combination of the hollow guard $h$, for embracing the upper end of the shell, the piston $r$, for compressing the powder within the shell, the cam-lever G F, for acting upon said guard and piston, the feeding and measuring devices, and suitable connecting mechanism between the lever F and the feeding and measuring device, whereby the latter and the guard and piston may be all operated through the same lever by a forward-and-backward movement, substantially as described, and for the purpose specified.

J. LESTER OSGOOD.

Witnesses:
JAMES SHEPARD,
JOHN EDWARDS, Jr.